(12) United States Patent
Yamaguchi et al.

(10) Patent No.: US 6,633,352 B2
(45) Date of Patent: *Oct. 14, 2003

(54) REFLECTION TYPE LIQUID CRYSTAL DISPLAY DEVICE

(75) Inventors: Hisanori Yamaguchi, Ishikawa (JP); Tomoaki Sekime, Kanazawa (JP); Yoshio Iwai, Kanazawa (JP); Tetsu Ogawa, Kanazawa (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,834

(22) Filed: Aug. 20, 1999

(65) Prior Publication Data

US 2003/0103175 A1 Jun. 5, 2003

(30) Foreign Application Priority Data

Aug. 24, 1998 (JP) .......................................... 10-237661

(51) Int. Cl.$^7$ ............................................. G02F 1/1335
(52) U.S. Cl. ......................... 349/102; 349/113; 349/118
(58) Field of Search ................................. 349/117, 118, 349/119, 113, 102, 96

(56) References Cited

U.S. PATENT DOCUMENTS

| | | | | |
|---|---|---|---|---|
| 4,586,790 A | * | 5/1986 | Umeda et al. | 349/117 |
| 5,734,455 A | | 3/1998 | Yoshida et al. | |
| 5,745,200 A | * | 4/1998 | Kikuchi et al. | 349/130 |
| 6,124,913 A | * | 9/2000 | Mazaki et al. | 349/117 |
| 6,130,735 A | * | 10/2000 | Hatanaka et al. | 349/113 |
| 6,137,556 A | * | 10/2000 | Yamahara | 349/136 |
| 6,147,727 A | * | 11/2000 | Shigeno | 349/117 |
| 6,271,905 B1 | * | 8/2001 | Sekime et al. | 349/117 |

FOREIGN PATENT DOCUMENTS

| | | |
|---|---|---|
| JP | 07084252 | 3/1995 |
| JP | 07146469 | 6/1995 |
| JP | 07036029 | 7/1995 |
| JP | 07261171 | 10/1995 |
| JP | 09043600 | 2/1997 |
| JP | 10-96887 | 4/1998 |

OTHER PUBLICATIONS

"38.4L: Late–News Papers: Novel Optical Compensation Film for AMLCDS Using a Discotic Compound", H. Mori et al., SID International Symposium Digest of Technical Papers, US, Santa Ana, vol. 28, May 13, 1997, pp. 941–944.

(List continued on next page.)

Primary Examiner—Toan Ton
(74) Attorney, Agent, or Firm—McDermott, Will & Emery (57) ABSTRACT

A reflection type liquid crystal display device having a wide viewing angle, and capable of assuring a light utilization factor at or above a certain value for bright display even when conditions of an external light are varied is provided. The reflection type liquid crystal display device comprises (a) a liquid crystal cell comprising an upper substrate, a lower substrate and a liquid crystal layer between the substrates, (b) a polarizing film provided in a side of the upper substrate in the liquid crystal cell, (c) light reflecting means provided in a side of the lower substrate in the liquid crystal cell; and (d) an optical member provided between the polarizing film and the liquid crystal cell, and having a retardation axis when it is viewed in the normal direction. An angle between an absorption axis of the polarizing film and the retardation axis of the optical member is within a range of about 88° to about 92° or about −2° to about +2°. A retardation value in relation to the normal direction of the optical member is within a range of about 50 nm to about 500 nm.

41 Claims, 8 Drawing Sheets

OTHER PUBLICATIONS

"11.5L: Late–News Paper: A Novel Wide–Viewing–Angle Motion–Picture LCD", H. Nakamura et al., SID International Symposium Digest of Technical Papers, US, Santa Ana, vol. 29, May 17, 1997, pp. 143–146.

"LP–H: Late–News Poster: Novel Compensation Foils for Active–Matrix TN Displays" P. van de Witte et al., SID International Symposium Disest of Technical Papers, US, Santa Ana, vol. 28, May 13, 1997, pp. 687–690.

* cited by examiner

REFLECTION TYPE LIQUID CRYSTAL DISPLAY DEVICE

FIELD OF THE INVENTION

The present invention relates to a display device, particularly a reflection type liquid crystal display device using a liquid crystal material.

BACKGROUND OF THE INVENTION

A liquid crystal display device is widely used in such various applications as a display, because it is characterized by thinness and lightness. A liquid crystal display device is a light-receiving type display device that provides display by varying an intensity of light transmitted therethrough without emitting light by itself, and can be driven by an effective voltage of several volts. Thus, when a liquid crystal display device with a reflector plate provided under the liquid crystal display device is employed as a reflection type display device for providing display by means of reflection of external light, a display device significantly low in power consumption can be obtained.

A reflection type color liquid crystal display device of prior art comprises liquid crystal cell provided with color filters and a pair of polarizing filters with the liquid crystal cell between them. The color filters are provided in one of substrates of the liquid crystal cell, and a transparent electrode is further provided on the color filters that are formed on the substrate. By applying a voltage to the liquid crystal cell, liquid crystal molecules of the liquid crystal material is changed in alignment, and a transmittance of light through the filters of various colors is thereby changed, thus color display is achieved.

A transmittance of light through one piece of polarizing plate is about 45% at the maximum. Then, a transmittance of light polarized parallel to an absorption axis of the polarizing film is about 0%, and that of light polarized vertically is about 90%. In a reflection type liquid crystal display device with two polarizing plates, the light passes through the polarizing films four times before it comes out. Therefore, if absorption of light by the color filters is disregarded, a light utilization factor of the liquid crystal display device is expressed by:

$$(0.9)^4 \times 50\% = 32.8\%$$

In other words, the light utilization factor is about 33% even in a black-and-white panel, and it is the maximum value of light utilization factor.

Then, in order to provide a brighter display, it is suggested to provide a polarizing film only in an upper side of a liquid crystal cell so that the liquid crystal cell is sandwiched between the polarizing film and a reflector plate (see, for example, Japanese Laid-open Patent Publication Nos. 7-146469 and 7-84252). In such case, the light passes the polarizing film twice. If absorption of light by the color filter is disregarded, a light utilization factor is expressed by:

$$(0.9)^2 \times 50\% = 40.5\%$$

Thus, it can be expected that the light utilization factor is increased by about 23.5% at the maximum in comparison with a liquid crystal display device with two polarizing films.

However, a light utilization factor of reflection type liquid crystal display device does't depend only on optimization of components. In a reflection type liquid crystal display device, display is provided not by means of such certain light source as back light system as in the case of a transmission type liquid crystal display, but by using an external light that is changed in various manners due to environmental conditions. In an external light, direct and indirect lights or parallel and scattered lights are contained in an mixed manner. Further, in an external light, the direction of incident light can be changed variously. Therefore, it is required that a reflection type liquid crystal display device provides a light utilization factor that is maintained at or above a certain value even when conditions of an external light is changed.

It has also been a problem of conventional reflection type liquid crystal display device that display characteristics are varied by conditions of an external light. The problem is partly caused due to a narrow viewing angle. When the viewing angle of liquid crystal display device is narrow, if the ratio of external light incident in the oblique direction is high, a utilization factor of effective light coming out to a general observation position is lower.

It is an object of the invention to provide such reflection type liquid crystal display device with only a polarizing plate that provides a wide viewing angle, and is capable of assuring a light utilization factor at or above a certain value so that bright display is provided even when conditions of an external light are varied.

SUMMARY OF THE INVENTION

A reflection type liquid crystal display device according to the invention comprises:

a liquid crystal cell provided with an upper substrate, a lower substrate and a liquid crystal layer located between the upper and lower substrates;

a polarizing film provided in a side of the upper substrate of the liquid crystal cell;

light reflecting means provided in a side of the lower substrate of the liquid crystal cell; and an optical member provided between the polarizing film and the liquid crystal cell, and having a retardation axis when it is viewed in the normal direction, wherein an angle between an absorption axis of the polarizing film and the retardation axis of the optical member is within at least one of ranges of:

(i) about 88° to about 92° and (ii) about −2° to about +2°.

It is particularly desirable that a retardation value in relation to the normal direction of the optical member is within a range of about 50 nm to about 500 nm.

According to such constitution, a reflection type liquid crystal display device having a characteristic of wide viewing angle, and capable of assuring a light utilization factor at or above a certain level for bright display even when conditions of an external light are varied.

REFERENCE NUMERALS 1, 5, 6, 7 Liquid crystal cell
10, 50, 60, 70 Polarizing film
11, 51, 61, 71 Optical member
12, 52, 62, 72 Optical compensation film
13-a, 51a, 61a, 71a Substrate
13b, 51b, 61b, 71b Substrate
14, 54, 64, 74 Color filter layer
15a, 55a, 65a, 75a Alignment layer
15b, 55b, 65b, 75b Alignment layer
16, 56, 66, 68, 76 Transparent electrode
17, 57, 67, 77 Liquid crystal layer
18, 58, 78 Metallic reflection electrode
59 Scattering film layer
69 Diffusion reflector plate
80 Gate electrode
81 Source line
82 TFT device
83 Drain electrode
84 Flattening film
85 Contact hole

DETAILED DESCRIPTION OF THE INVENTION

A reflection type liquid crystal display device according to the invention comprises:

a liquid crystal cell with a liquid crystal layer provided between a pair of substrates;

a polarizing film provided in a side of one of the substrates in relation to the liquid crystal layer; and light reflecting means provided in a side of the other substrate in relation to the liquid crystal layer, wherein an optical member having a retardation axis when it is viewed in the normal direction is provided between the polarizing film and the liquid crystal cell, a retardation value in relation to the normal direction of the optical member is at 50 nm to 500 nm, and an angle between an absorption axis of the polarizing film and the retardation axis of the optical member is at 88° to 92°.

According to such constitution, variation in viewing angle of a degree of polarization caused when the polarizing film is viewed in the oblique direction can be compensated by the optical member. As a result, a viewing angle characteristic of reflection type liquid crystal display device is improved, and a reflection type liquid crystal display device depending less on an external light, and capable of providing a bright display image can be obtained.

Another reflection type liquid crystal display device according to the invention comprises:

a liquid crystal cell with a liquid crystal layer provided between a pair of substrates;

a polarizing film provided in a side of one of the substrates in relation to the liquid crystal layer; and light reflecting means provided in a side of the other substrate in relation to the liquid crystal layer, wherein an optical member having a retardation axis when it is viewed in the normal direction is provided between the polarizing film and the liquid crystal cell, a retardation value in relation to the normal direction of the optical member is at 50 nm to 500 nm, and an angle between an absorption axis of the polarizing film and the retardation axis of the optical member is at −2° to +2°.

According to such constitution, variation in viewing angle of a degree of polarization caused when the polarizing film is viewed in the oblique direction can be compensated by the optical member. As a result, a viewing angle characteristic of reflection type liquid crystal display device is improved, and a reflection type liquid crystal display device depending less on an external light, and capable of providing a bright display image can be obtained.

It is particularly desirable that a retardation value in relation to the normal direction of the optical member is at 200 nm to 400 nm. According to such constitution, a reflection type liquid crystal display device providing a property of more preferable viewing angle can be obtained.

It is specifically desirable that the optical member is a polymer film. As a result of such constitution, a reflection type liquid crystal display device providing a preferable viewing angle characteristic can be obtained without increase in thickness and weight.

The polymer film can be formed by using polycarbonate, polyallylate or polysulfone.

It is particularly desirable that the optical member is of a hybrid tilt type.

According to such constitution, variation in viewing angle of a degree of polarization caused when a polarizing film is viewed in the oblique direction can be compensated by the optical member, and a tilt status of liquid crystal cell can be also optically compensated. As a result, an effect of improving a viewing angle can be further increased.

It is particularly desirable that the optical member of hybrid tilt type is of such positive hybrid tilt type that refractive indices "$n_x$, $n_y$, $n_z$" meet a relation of "$n_x > n_y \approx n_z$", simultaneously, "$n_y$" falls within a surface of the optical member, "$n_x$" viewed in the direction of "y" is at about 0° to about 10° in a side of the optical member, a tilt angle in the other side of the optical member is at about 60° to 90°, and it is continuously changed in tilt angle between the angles.

An optical member of such positive hybrid tilt type comprises a substrate subjected to a homeotropic surface treatment, a substrate subjected to a homogeneous surface treatment and a nematic liquid crystal sealed between the substrates.

Alternatively, in the optical member of hybrid tilt type, refractive indices "$n_x$, $n_y$, $n_z$" meet a relation of "$n_x \approx n_y > n_z$", simultaneously, the refractive index "$n_y$" falls within a surface of the optical member, the refractive index "$n_z$" when the optical member is viewed in the direction of "y" is at about 0° to about 10° in a side of the optical member, while it is at about 60° to about 90° in the other side, and the refractive index is continuously changed in tilt angle from one to the other side of the optical member. In other words, the optical member provides a refractive index of such negative hybrid tilt type.

Such optical member of negative hybrid tilt type comprises a first substrate subjected to a homeotropic surface treatment, a second substrate subjected to a homogeneous surface treatment and a discotic liquid crystal sealed between the first and second substrates.

Preferably, a liquid crystal layer in the liquid crystal cell contains a nematic liquid crystal. According to such constitution, a reflection type liquid crystal display device having a superior viewing angle characteristic can be obtained.

It is particularly desirable that the liquid crystal cell is a twisted nematic liquid crystal cell having a twist angle of about 40° to about 90°.

Alternatively, it is further desirable that the liquid crystal cell is a super-twisted nematic liquid crystal cell having a twist angle of about 220° to about 260°

Preferably, an optical retardation film is provided between the optical member and the liquid crystal cell. According to such arrangement, color compensation and the like can be achieved, and a reflection type liquid crystal display device having a very superior viewing angle characteristic can be obtained as a result.

It is preferable that the optical retardation film is provided with at least a high polymer film. As a result of such arrangement, a reflection type liquid crystal display device providing a preferable viewing angle characteristic can be obtained without causing significant increase in thickness and weight.

Further, it is preferable that a scattering film is provided in a side of a substrate. By such arrangement, an ambient light is converged, and bright display can be achieved as a result. Also, because the scattering film is provided in a side of a substrate, blurring and dimness of a display image can be reduced.

Preferably, the scattering film is a forward scattering film. As a result of such arrangement, the ambient light can be more effectively used.

Preferably, the light reflecting means is a metallic reflecting electrode provided in the liquid crystal cell. As a result of such arrangement, the metallic reflecting electrode functions as light reflecting means and an electrode. Accordingly, a reflection type liquid crystal display device can be thinner, as it is formed by fewer components.

It is preferable that the metallic reflecting electrode contains at least a metal selected from aluminum and silver. According to such arrangement, a metallic reflecting electrode having a superior conductivity and reflectivity can be provided.

Preferably, the metallic reflecting electrode has a mirror surface. As a result of such arrangement, fluctuation in alignment of a liquid crystal is reduced, and a natural visibility can be achieved.

The metallic reflecting electrode is preferably formed with a scattering film thereon. According to such arrangement, a reflection type liquid crystal display device providing a natural visibility can be obtained.

Preferably, a surface of the metallic reflecting electrode provides a diffuse reflecting surface that diffusely reflects an incident light. According to such arrangement, a reflection type liquid crystal display device providing a natural visibility can be obtained as well. It is particularly preferable that the diffuse reflecting surface has unevenness of 3° to 12° in mean inclination angle. As a result of such arrangement, a superior diffuse reflectivity can be achieved.

The other substrate may be a transparent substrate, and the light reflecting means may be a light reflecting plate provided outside the transparent substrate. In such case, the light reflecting plate is preferably a diffuse reflecting plate. As a result of such arrangement, a superior diffusing effect can be achieved, and a reflection type liquid crystal display device providing a superior visibility can be obtained.

Preferably, an air layer is provided between the transparent substrate and the light reflecting plate. In such manner, a higher diffusing effect can be achieved because of presence of the air layer that is different in reflectivity, and more natural visibility can be provided.

It is preferable that a color filter is provided in a side of said one substrate. As a result of such arrangement, a reflection type color liquid crystal display device can be obtained.

Preferably, a non-linear element is provided in a side of the other substrate. According to such arrangement, a reflection type liquid crystal display device having a superior display property by active drive can be obtained.

It is preferable that an insulating flattening film is provided on the non-linear element, and the flattening film is formed with a contact hole for electrical connection between the non-linear element and the electrode in the side of the other substrate therein.

As a result of such arrangement, the aperture ratio is higher, and a reflection type liquid crystal display device having a higher light utilization factor can be accordingly provided.

Exemplary embodiments of the invention are described below by referring to the drawings.

Exemplary Embodiment 1

Figure 1:
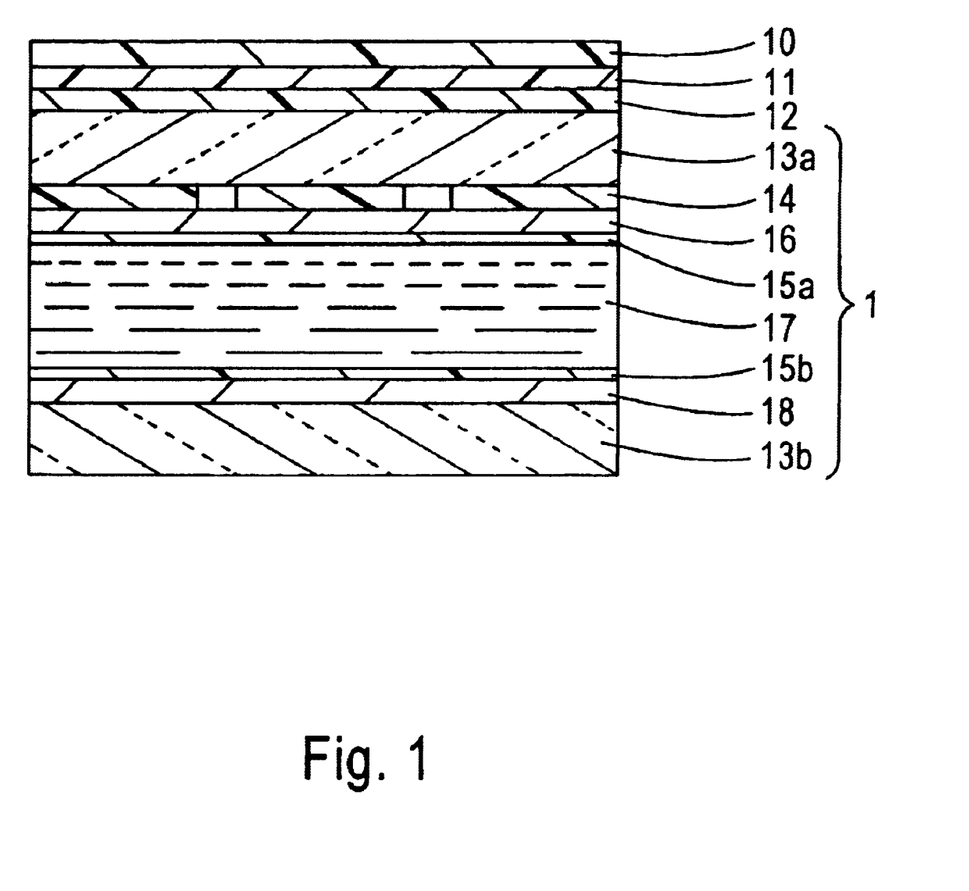
FIG. 1 is a schematic sectional view of a reflection type liquid crystal display device according to Embodiments 1 and 2 of the invention.

FIG. 1 is a schematic sectional view of a reflection type liquid crystal display device according to Embodiment 1 of the invention. In FIG. 1, the reflection type liquid crystal display device comprises an optical compensation layer 12 provided in a surface of a liquid crystal cell 1, an optical member 11 having a retardation axis when it is viewed from a front side and a polarizing film 10. The retardation axis viewed from the front side means a retardation axis viewed in the normal direction.

The liquid crystal cell 1 comprises an upper substrate 13a and a lower substrate 13b. The upper substrate 13a is provided with a color filter layer 14, a transparent electrode 16 and an alignment layer 15a. The lower substrate 13b is provided with a metallic reflecting electrode 18 and an alignment layer 15b. A liquid crystal layer 17 is provided by sealing a liquid crystal between the alignment layers 15a and 15b. Out of the upper and lower substrates 13a and 13b, at least the substrate 13a is a transparent substrate.

Next, a production process of the reflection type liquid crystal display device is described.

For the upper and lower substrates 13a and 13b, no-alkali glass substrates (for example, 1737 prepared by Corning) are employed. First, the color filter layer 14 with red, green and blue stripes provided in alignment with each other by using dyes of pigment dispersion type is formed on the upper substrate 13a by photolithography. Above it, the transparent electrode 16 as a pixel electrode is formed by using indium-tin oxide (ITO).

Then, a titanium layer of 300 nm in thickness is deposited on the lower substrate 13b. Further, an aluminum layer of a thickness of 200 nm is deposited on the titanium layer. A surface of the aluminum layer is formed unevenly to provide unevenness of a mean inclination angle of 3° to 12°. In such manner, a metallic reflecting electrode 18 of diffuse (scattering) reflection type is provided.

Next, a polyimide solution containing 5 wt. % of γ-butyrolactone is applied by printing onto the transparent electrode 16 and the metallic reflecting electrode 18, and solidified at a temperature of 250° C. After that, an alignment process is conducted by rotational rubbing method using a rayon cloth so that a twist angle of 63 is achieved. In such manner, the upper alignment layer 15a and lower alignment layer 15b are formed.

Then, a thermosetting sealing resin (for example, Stract Bond prepared by Mitsui Toatsu Chemicals, Inc.) containing 1.0 wt. % of glass fibers is applied by printing to a peripheral part of the surface of upper substrate 13a. The glass fiber has a diameter of 4.0 μm. Resin beads having a diameter of 3.0 μm are distributed on the substrate 13b at the ratio of 100 to 200 beads/mm$^2$.

The upper and lower substrates 13a and 13b are, then, bonded together, and the sealing resin is set at a temperature of 150° C. After that, a liquid crystal is vacuum-injected between the upper and lower alignment layers 15a and 15b. As the-liquid crystal, a mixture of a nematic liquid crystal of fluorine ester system having an optical anisotropy $\Delta n_{LC}$ of 0.08 and a chiral liquid crystal is employed for achieving a chiral pitch of 80 μm. After injection of the liquid crystal, the injection port is sealed by a ultraviolet-setting resin. The resin is set by a ultraviolet ray. In such manner, the liquid crystal cell 1 is prepared.

In a surface of the upper substrate 13a of the liquid crystal cell 1 prepared in such manner, the optical compensation layer 12 is applied to provide a normally white appearance. The optical compensation layer 12 has two polycarbonate films. Above the optical compensation layer 12, the optical member 11 having a retardation axis when it is viewed from the front side is provided. For such optical member 1, polycarbonate is employed.

Further, the polarizing film 10 is provided on the optical compensation layer 12. As the polarizing film 10, a neutral gray polarizing film (SQ-1852AP prepared by Sumitomo Chemical Co., Ltd.) is employed after it is subjected to anti glare (AG) treatment and antireflection (AR) treatment. In this step, such arrangement is made that an absorption axis of the polarizing film 10 is positioned at an angle of 90° in relation to the retardation axis of optical member 11.

As a result of above process, a reflection type liquid crystal display device according to the embodiment is completed.

For the purpose of comparison, a conventional reflection type liquid crystal display device without the optical member 11 was prepared. Optical properties of the reflection type liquid crystal display device according to the embodiment and the conventional one were measured. In the measurement of optical properties, a perfectly diffused light was used. The reflection type liquid crystal display device according to the embodiment provided a reflectivity converted to Y-value of white of 19.8% and a contrast of 16.1. On the other hand, the conventional reflection type liquid crystal display device without the optical member 11 provided a reflectivity converted to Y-value of white of 17.6% and a contrast of 14.0. Thus, below findings were obtained. In the case such light containing a oblique incident light component at a higher percentage as diffused light is used, the reflection type liquid crystal display device with the optical member 11 according to the embodiment provides a higher light utilization factor and more preferable front-side properties in comparison with the conventional liquid crystal display device.

The properties were measured by varying retardation when the optical member 11 is viewed in the perpendicular direction. As a result, when the retardation is within a range of about 50 nm to about 500 nm, preferable properties were obtained, and most preferable properties were obtained when the retardation is at about 200 nm to about 400 nm.

Also, when the absorption axis of polarizing film 10 was positioned at an angle of 0° in relation to the retardation axis of optical member 11, similarly to the above case, preferable properties were obtained.

Next, a viewing angle characteristic of the liquid crystal display devices was evaluated. By setting the retardation of polycarbonate of the optical member 11 at 300 nm, a difference in viewing angle characteristic was determined between the reflection type liquid crystal display device with the optical member 11 according to the embodiment and the reflection type liquid crystal display device without the optical device 11.

Figure 2A:
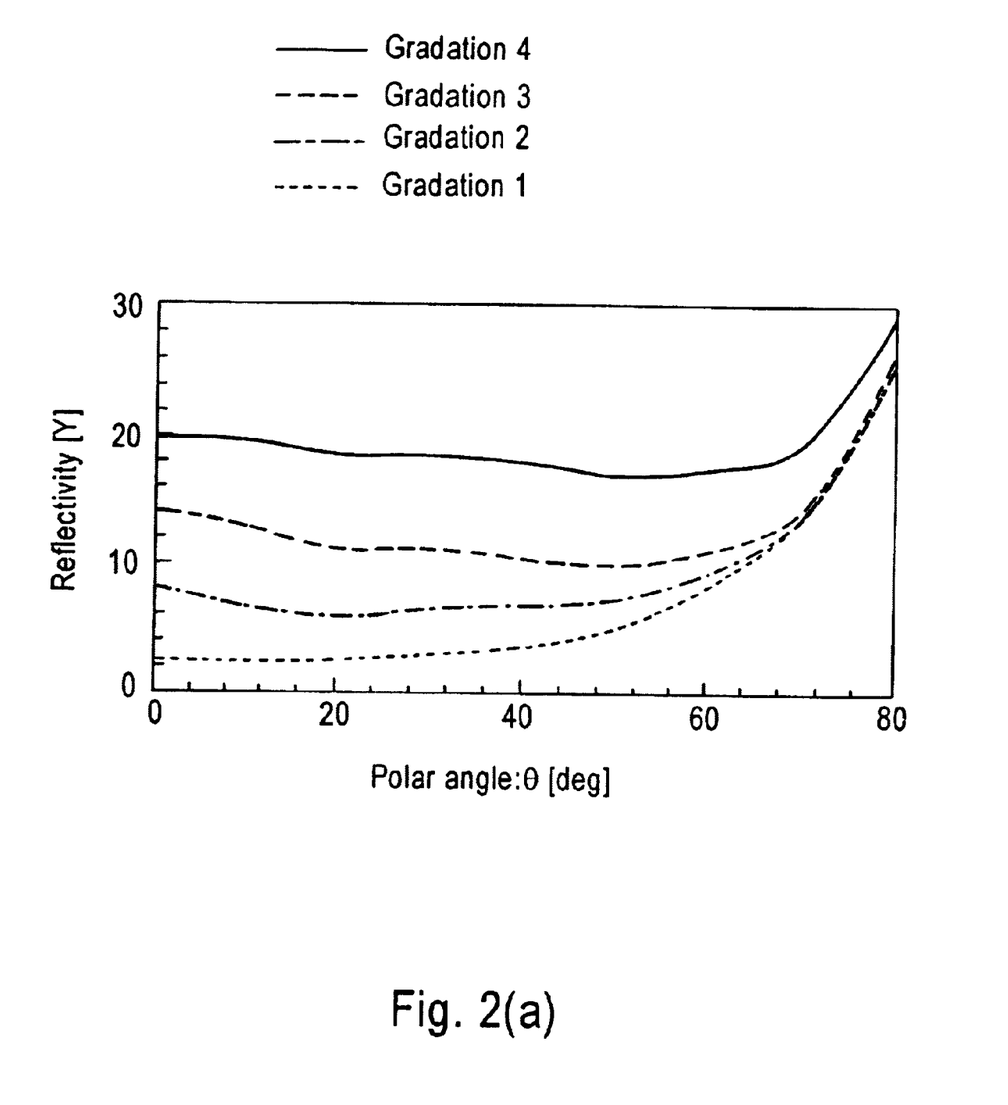
FIG. 2(a) is a graphical representation showing a reflectivity property in relation to a viewing angle of the reflection type liquid crystal display device.
Figure 2B:
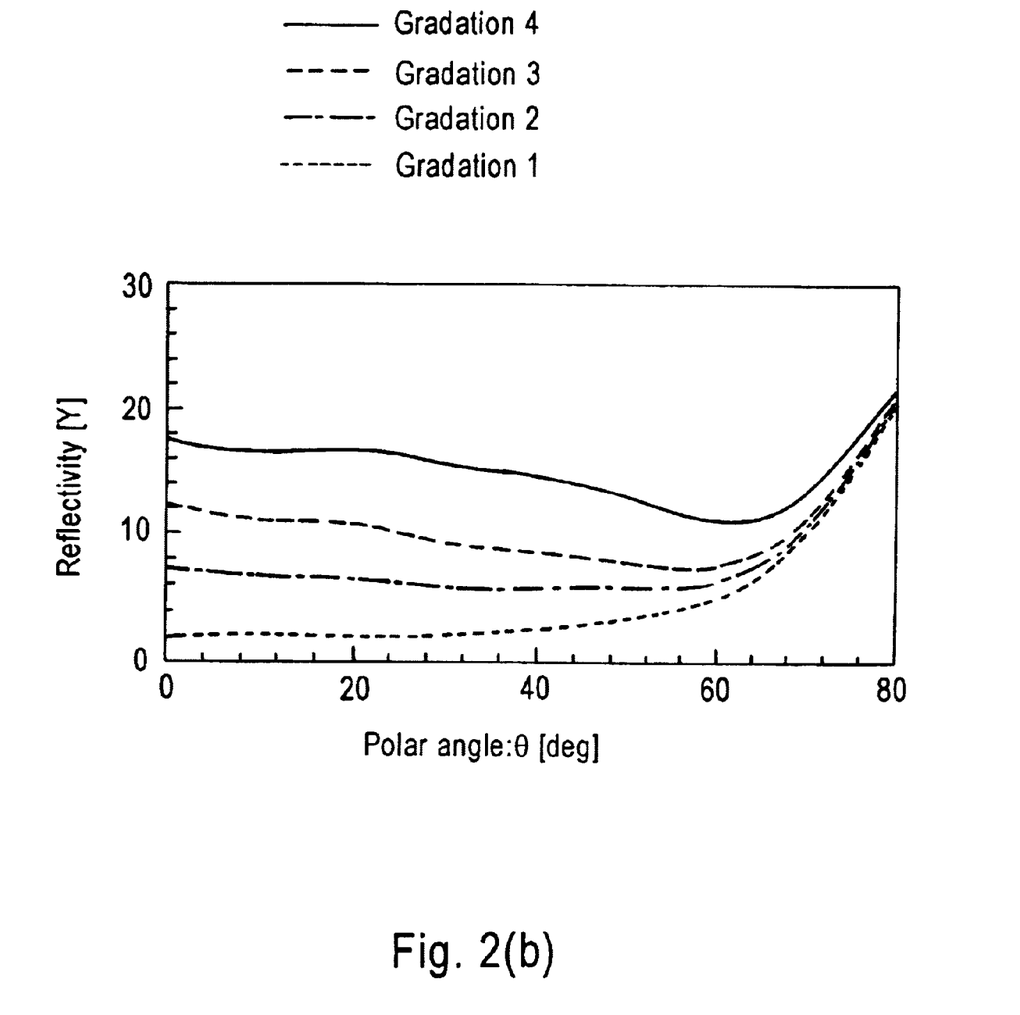
FIG. 2(b) is a graphical representation showing, for the purpose of comparison, a reflectivity property of a liquid crystal display device with an optical member having a retardation axis removed from the reflection type liquid crystal display device.

FIG. 2(a) shows a viewing angle characteristic of the reflection type liquid crystal display device according to the embodiment. FIG. 2(b) shows, for the purpose of comparison, a viewing angle characteristic of the reflection type liquid crystal display device without the optical member 11. By comparing FIGS. 2(a) and (b), it is found that the viewing angle characteristic is improved in the reflection type liquid crystal display device with the optical member 11 according to the embodiment. It means that the embodiment of FIG. 2(a) provides a reflectivity higher than that of the comparison example of FIG. 2(b) in terms of a reflectivity when a polar angle "θ" is at about 40 or less. It represents that reduction of the reflectivity is improved, and a brightness can be maintained in a wide range without gradation inversion.

In above description, although the absorption axis of polarizing film 10 is positioned at an angle of 90° or 0° in relation to the retardation axis of optical member 11, the effect is particularly superior in the case the angle is within a range of about 88° to about 92° or about −2 to about +2°.

Also, in above constitution, although a polymer film of polycarbonate is employed as the optical member 11, polyallylate or such material as polysulfone can be used, and a similar effect is obtained in such arrangement as well. However, materials of the optical member 11 are not limited thereto, those providing a retardation value within a range of about 50 nm to about 500 nm can be employed, and a superior effect similar to that described above can be also obtained in such case.

Although the twist angle in the liquid crystal cell 1 is set at 63° in the embodiment, the twist angle is not limited thereto, and is preferably within a range of about 40° to about 90°. In such case, an effect similar to that described above can be obtained.

Further, although a metallic reflecting electrode with aluminum deposited thereon is used in the embodiment, it is not limited thereto, and a similar effect can be obtained by employing a metallic reflecting electrode using silver.

Exemplary Embodiment 2

Figure 3A:
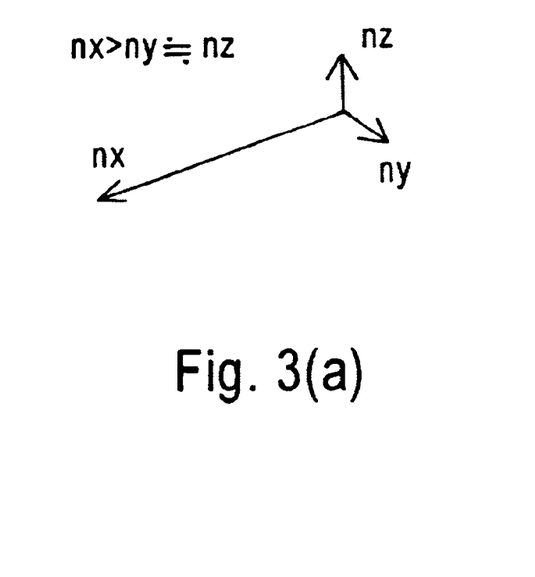
FIG. 3(a) is a schematic illustration showing a refractive index for explanation of an optical member of positive hybrid tilt type that is provided in the reflection type liquid crystal display device according to Embodiment 2 of the invention.

In a reflection type liquid crystal display device according to the embodiment, refractive indices "$n_x$, $n_y$, $n_z$" of optical member 11 having a retardation axis when it is viewed from the front side meet a relation of "$n_x > n_y \approx n_z$", as shown in FIG. 3(a), where "nx" is a refractive index in the direction of "x", "$n_y$" is a refractive index in the direction of "y" and "$n_z$" is a refractive index in the direction of "z". The direction of "y" falls within a surface of the optical member 11. Other arrangements are similar to those of Embodiment 1 shown in FIG. 1, and are not described in detail.

Figure 3B:
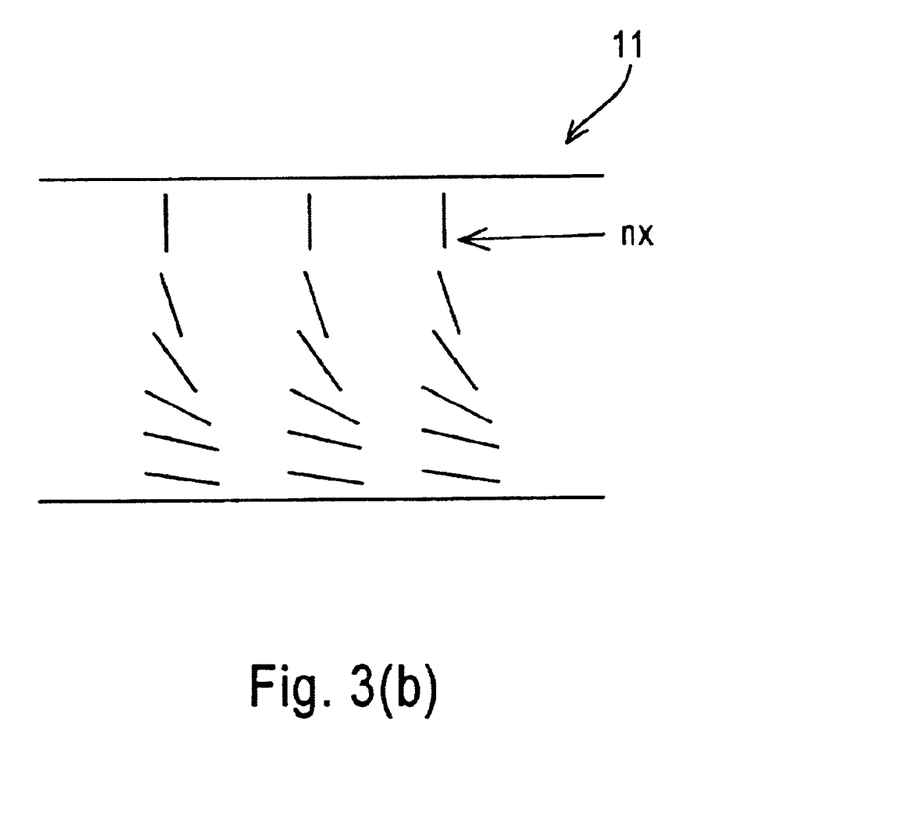
FIG. 3(b) is a schematic sectional view of the optical member viewed in the direction of "ny".

The refractive index "$n_x$" when the optical member 11 is viewed in the direction of "y" has a tilt angle of 5° in a side of the optical member 11 and a tilt angle of 90° in the other side, as shown in FIG. 3(b), and the refractive index is continuously changed in tilt angle between them. It means that the optical member 11 provides a refractive index of positive hybrid tilt type.

In the optical member 11 of positive hybrid tilt type, it is preferable that "$n_x$" when it is viewed in the direction of "y" has a tilt angle within a range of about 0 to about 10° in a side of the optical member 11 and a tilt angle of about 60° to 90° in the other side of the optical member. In such constitution, a preferable viewing angle characteristic as described above can be obtained.

The optical member 11 of positive hybrid tilt type is prepared by bonding together a glass substrate that is formed with a homeotropically aligned film and a glass substrate that is formed with a film homogeneously aligned by unidirectional rotational rubbing for achieving the alignment, and injecting a nematic liquid crystal between the substrates. In this operation, the optical member 11 is arranged such that a retardation of 300 nm is achieved when it is viewed from the front side.

Optical properties of the reflection type liquid crystal display device comprising the optical member 11 of positive hybrid tilt type that is prepared in such manner were measured. As a result, in regard to front-side properties measured by using a perfectly diffused light, a reflectivity converted to a Y-value of white was at 19.5%, and a contrast at 15.9. Thus, it was found that a reflection type liquid crystal device providing a high light utilization factor and preferable front-side properties could be obtained by using the optical member 11 of positive hybrid tilt type. Additionally, it was also confirmed that color display properties were further improved because the liquid crystal layer 1 was compensated by the optical member 11 of hybrid alignment type.

Although an optical member of positive hybrid tilt type is employed as the optical member 11 in the embodiment, an effect similar to that described above can be obtained in a liquid crystal display device with an optical member of negative hybrid tilt type used as the optical member 11, as described below.

Figure 4A:
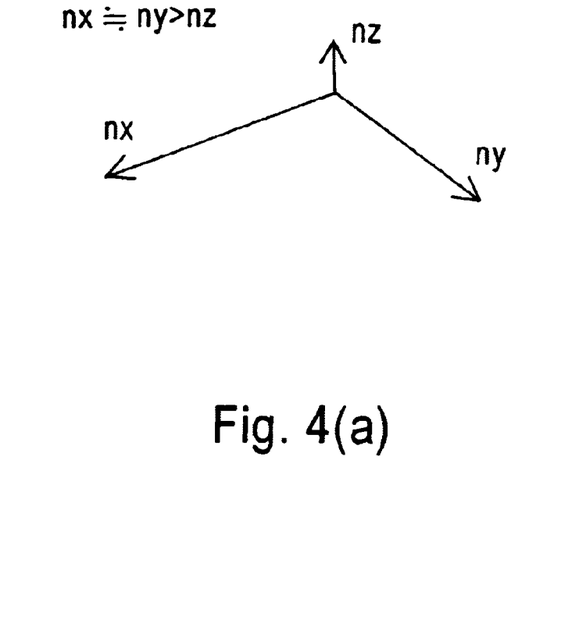
FIG. 4(a) is a schematic illustration showing a refractive index for explanation of an optical member of negative hybrid tilt type that is provided in a variation of the reflection type liquid crystal display device according to the Embodiment 2.
Figure 4B:
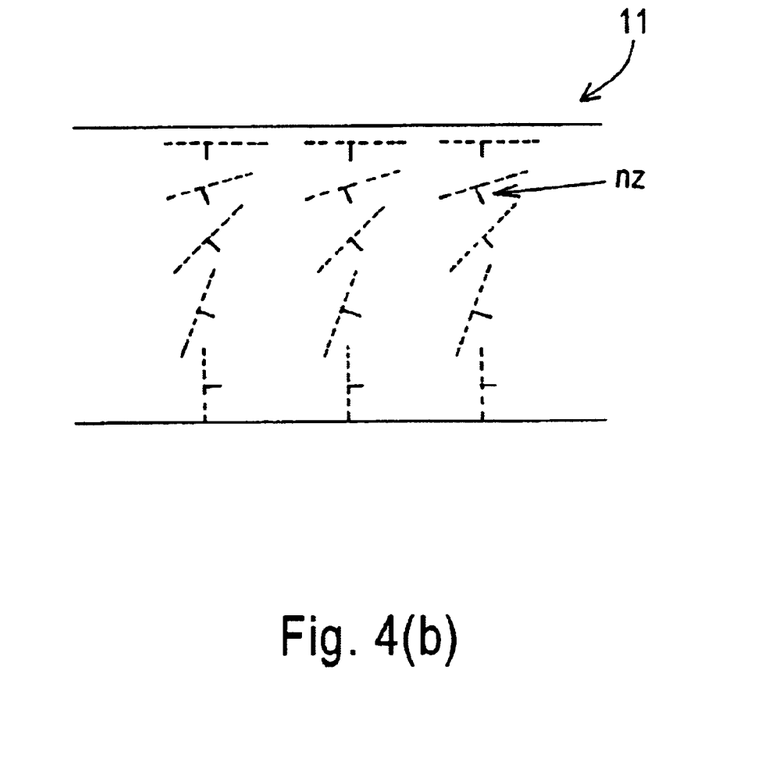
FIG. 4(b) is a schematic sectional view of the optical member viewed in the direction of "ny".

As shown in FIG. 4(a), refractive indices "$n_x$, $n_y$, $n_z$" of an optical member 11 of negative hybrid tilt type meet a relation of "$n_x \approx n_y > n_z$", where "$n_x$" is a refractive index in the direction of "x", "$n_y$" is a refractive index in the direction of "y", and "$n_z$" is a refractive index in the direction of "z". The direction of "y" falls within a surface of the optical member 11. In addition, the refractive index "$n_z$" when the optical member 11 is viewed in the direction of "y" has a tilt angle of 5° in a side of the optical member 11 and a tilt angle of 90° in the other side, as shown in FIG. 4(b), and the refractive index is continuously changed in tilt angle between them. It means that the optical member 11 has a refractive index that is changed in tilt angle.

In the optical member 11 of negative hybrid tilt type, it is preferable that "$n_z$" when it is viewed in the direction of "y" has a tilt angle within a range of about a 0° to about 10° in a side of the optical member 11 and a tilt angle of about 60° to about 90° in the other side of the optical member 11. In such constitution, a preferable viewing angle characteristic can be achieved.

A liquid crystal display device with the optical member 11 of negative hybrid tilt type used therein is prepared in steps of bonding together a glass substrate that is formed with a homeotropically aligned film and a glass substrate that is formed with a film homogeneously aligned by unidirectional rotational rubbing for achieving the alignment and injecting a discotic liquid crystal between the substrates. In such operation, the optical member 11 is produced in such manner that a retardation of 300 nm is achieved when it is viewed from the front side.

Optical properties of the reflection type liquid crystal display device with the optical member 11 of negative hybrid type employed therein were measured. In regard to front-side properties measured by using a perfectly diffused light, a reflectivity converted to a Y value of white was at 19.4%, and a contrast at 16.0. Thus, it was found that the reflection type liquid crystal device with the optical member 11 of negative hybrid tilt type provides a high light utilization factor and preferable front-side properties. Additionally, it was also confirmed that color display properties were also further improved because the liquid crystal layer 1 is compensated by the optical member 11 of hybrid alignment type.

Exemplary Embodiment 3

Figure 5:
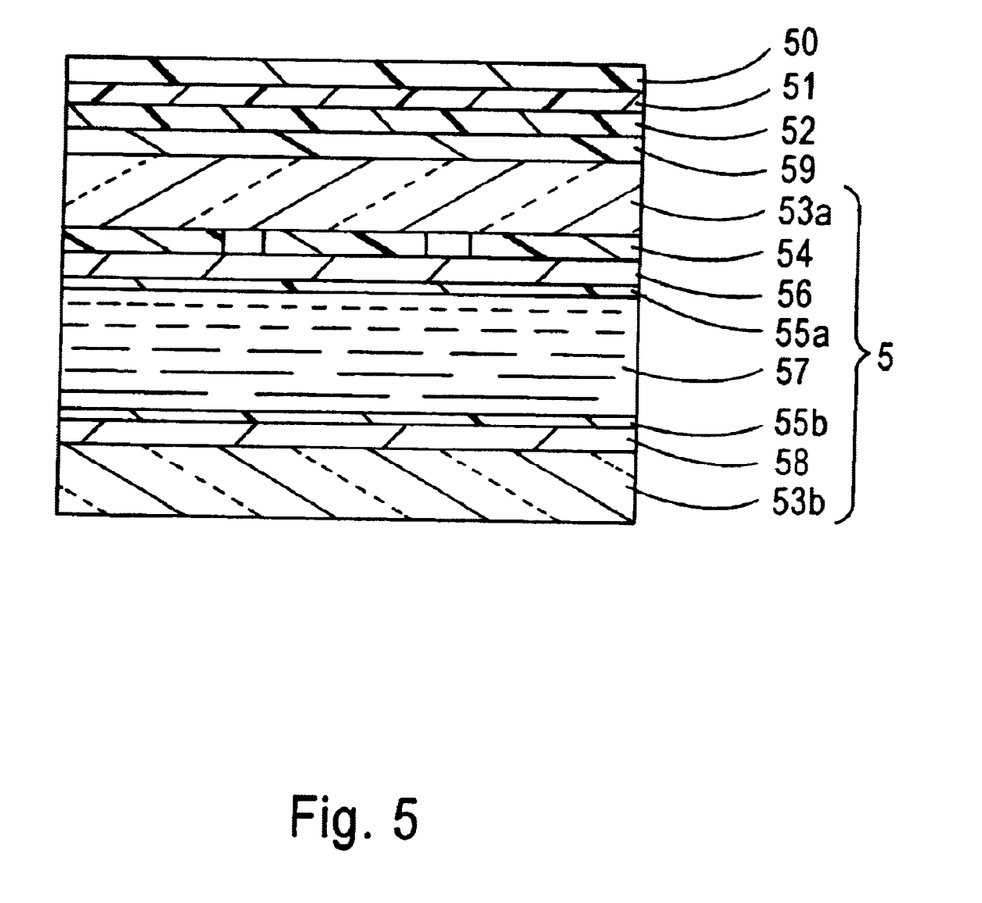
FIG. 5 is a schematic sectional view of a reflection type liquid crystal display device according to Embodiment 3 of the invention.

FIG. 5 is a schematic sectional view of a reflection type liquid crystal display device according to Embodiment 3 of the invention. In the reflection type liquid crystal display device, a scattering film layer 59, an optical compensation layer 52, an optical member 51 and a polarizing film 50 are laminated in a surface of a liquid crystal cell 5 in that order. The liquid crystal cell 5 is of STN type. The optical member 51 has a retardation axis when it is viewed from the front side, that is, in the normal direction.

The liquid crystal cell 5 comprises an upper and lower substrates 53a and 53b. The upper substrate 53a is provided with a color filter layer 54, a transparent electrode 56 and an alignment layer 55a. The lower substrate 53b is provided with a metallic reflecting electrode 58 and an alignment layer 55b. A liquid crystal layer 57 is provided by sealing a liquid crystal between the upper and lower alignment layers 55a and 55b. Out of the upper and lower substrates 53a and 53b, at least the upper substrate 53a is a transparent substrate.

A production process of the reflection type liquid crystal display device is described below.

For the upper and lower substrates 53a and 53b, soda glass substrates with SiO undercoat, are employed. First, the color filter layer 54 with an alignment of red, green and blue stripes provided by using dyes of pigment dispersion type is formed on the upper substrate 53a by photolithography. Above it, the transparent electrode 56 is formed by using indium-tin oxide (ITO).

Next, a titanium layer of 300 nm in thickness is deposited on the lower substrate 53b, and an aluminum layer of a thickness of 200 nm is deposited above it. In such manner, the metallic reflecting electrode 58 having a mirror surface is provided.

Then, a N-methyl-2-pyrrolidinone containing 6 wt. % of polyamic acid is applied onto the transparent electrode 56 and the metallic reflecting electrode 58 by printing, and set at a temperature of 250° C. After that, the upper alignment layer 55a and lower alignment layer 55b are formed as a result of alignment layer treatment by rotational rubbing method using a rayon cloth at a temperature of 240° C. It is preferable that the twist angle is within a range of about 220° to about 260°.

Next, a thermosetting sealing resin (for example, Stract Bond prepared by Mitsui Toatsu Chemicals, Inc.) containing 1.0 wt. % of glass fibers is applied by printing to a peripheral part of the surface of upper substrate 53a. The glass fiber has a diameter of 7.0 μm. Resin beads having a diameter of 6.0 μm are distributed on the substrate 53b at the ratio of 100 to 200 beads/mm². The upper and lower substrates 53a and 53b are, then, bonded together, and the sealing resin is set at a temperature of 150° C. After that, a liquid crystal is, vacuum-injected between the substrates. As the liquid crystal, a mixture of a nematic liquid crystal of ester system having an optical anisotropy $\Delta n_{LC}$ of 0.14 and a chiral liquid crystal is employed, and formulated to achieve a chiral pitch of 10 μm. After injection of the liquid crystal, the injection port is sealed by a ultraviolet-setting resin, and the resin is set by a ultraviolet ray.

In a surface of the upper substrate 53a of the liquid crystal cell 5 prepared in such manner, an isotropic forward scattering film is applied as the scattering film layer 59. On the scattering film layer 59, the optical compensation layer 52 comprising two polycarbonate films is applied for color compensation of the super-twisted nematic liquid crystal. Further, a polycarbonate film is applied onto the optical compensation layer 52 as the optical member 51 having a retardation axis when it is viewed from the front side.

Additionally, the polarizing film 50 is applied onto the optical member 51. As the polarizing film 50, a neutral gray polarizing film (SQ-1852AP prepared by Sumitomo Chemical Co., Ltd.) is employed after it is subjected to antiglare (AG) treatment and antireflection (AR) treatment. In this step, such arrangement is made that an absorption axis of the polarizing film 50 is positioned at an angle of 90° in relation to the retardation axis of opticalmember 51.

As a result of above process, a reflection type liquid crystal display device according to the embodiment is completed.

For the purpose of comparison, a conventional reflection type liquid crystal display device without the optical member 51 was prepared. Optical properties of the reflection type liquid crystal display device according to the embodiment and the conventional one were measured. In the measurement of front-side properties using a perfectly diffused light, the reflection type liquid crystal display device according to the invention provided a reflectivity converted to a Y-value of white of 15.2% and a contrast of 8.1. On the other hand, the conventional reflection type liquid crystal display device without the optical member 51 provided a reflectivity converted to a Y-value of white of 12.3% and a contrast of 6.3. Thus, it was found that the reflection type liquid crystal display device with the optical member 51 according to the embodiment provides a higher light utilization factor and more preferable front-side properties in comparison with the conventional liquid crystal display device, in the case such light containing a oblique incident light component at a higher percentage as diffused light is used.

Optical properties were determined in samples that were varied in retardation of the optical member 51 when it is viewed in the perpendicular direction. As a result, when the retardation is within a range of about 50 nm to about 500 nm, the properties were preferable. It was found that the effect was significantly superior particularly when the retardation was within a range of about 200 nm to about 400 nm.

It was also confirmed that preferable properties were obtained similarly to the above case, when the absorption axis of polarizing film 50 was positioned at an angle of 0° in relation to the retardation axis of optical member 51.

In the reflection type liquid crystal display device according to the embodiment, because an ambient light is converged by provision of the scattering film layer 59, bright display can be achieved. In addition, since the scattering film layer 59 is provided only in a side of the liquid crystal cell 5, dimness and blurring of a display image can be reduced. Besides, because the forward scattering film is used as the scattering film layer 59, the light utilization factor is further enhanced. The scattering film used as the scattering film layer 59 preferably has a high forward scattering performance to such extent that almost no backward scattering characteristic is observed.

In above description, although the absorption axis of polarizing film 50 is positioned at an angle of 90° and 0° in relation to the retardation axis of optical member 51, the angle is preferably within a range of about 88° to about 92° or about −2 to about +2°. In such arrangement, an effect similar to that described above can be obtained as well.

Although a polymer film of polycarbonate is employed as the optical member 51 in above constitution, polyallylate or such material as polysulfone can be used, and a similar effect is obtained in such arrangement as well. However, materials of the optical member 51 are not limited thereto, those providing a retardation value within a range of about 50 nm to about 500 nm can be employed, and a superior effect similar to that described above can be also obtained in such case.

Also, although an aluminum deposition layer is used as the metallic reflecting electrode in the embodiment, it is not limited thereto, a metallic reflecting electrode using silver, for example, can be also used to provide a superior effect as that described above.

Exemplary Embodiment 4

Figure 6:
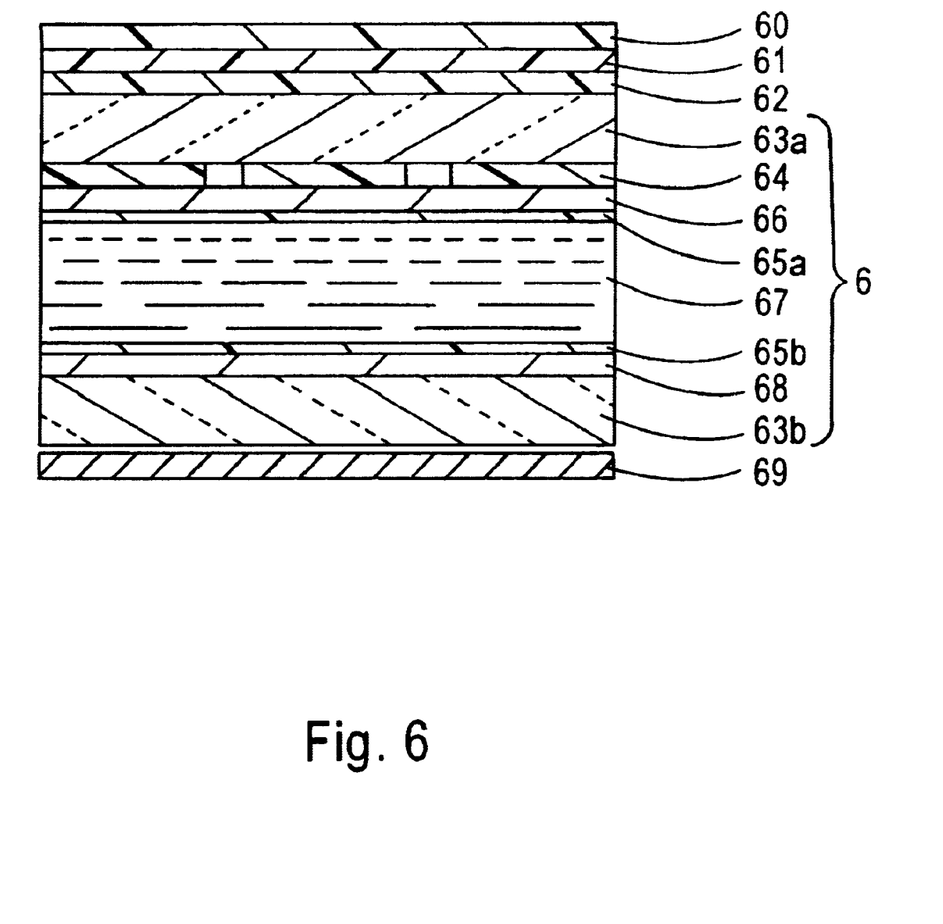
FIG. 6 is a schematic sectional view of a reflection liquid crystal display device according to Embodiment 4 of the invention.

FIG. 6 is a schematic sectional view of a reflection type liquid crystal display device according to Embodiment 4 of the invention. In the reflection type liquid crystal display device, an optical compensation layer 62, an optical member 61 and a polarizing film 60 are laminated in a surface of a liquid crystal cell 6 in that order. In the other surface of the liquid crystal cell 6, a diffuse reflecting plate 69 is provided. The optical member 61 has a retardation axis when it is viewed from the front side, that is, in the normal direction.

The liquid crystal cell 6 comprises transparent upper and lower substrates 63a and 63b. The upper substrate 63a is provided with a color filter layer 64, a transparent electrode 66 and an alignment layer 65a. The lower substrate 63b is provided with a transparent electrode 68 and an alignment layer 65b. A liquid crystal layer 67 is 1provided by sealing a liquid crystal between the upper and lower alignment layers 65a and 65b.

Now, a production process of the reflection type liquid crystal display device is described.

For the upper and lower substrates 63a and 63b, noalkali glass substrates (for example, 1737 prepared by Corning) are employed. First, the color filter layer 64 with red, green and blue stripes provided in alignment with each other by using dyes of pigment dispersion type is formed on the upper substrate 63a by photolithography. Above the color filter layer 64, the upper transparent electrode 66 as a pixel electrode is formed by using indium-tin oxide (ITO). Also, the lower transparent electrode 68 is formed on the lower substrate 63b similarly by using indium-tin oxide.

Next, γbutyrolactone solution containing 5 wt. % of polyimide is applied by printing onto the upper and lower transparent electrodes 66 and 68, and set at a temperature of 250° C. After that, an alignment process is conducted by rotational rubbing method using a rayon cloth so that a twist angle of 63° is achieved. In such manner, the upper alignment layer 65a and lower layer 65b are formed. The twist angle is preferably within a range of about 40° to 90°

Then, a thermosetting sealing resin (for example, Stract Bond prepared by Mitsui Toatsu Chemidals, Inc.) containing 1.0 wt. % of glass fibers is applied by printing to a peripheral part of the surface of substrate 63a. The glass fiber has a diameter of 4.0 μm. Resin beads having a diameter of 3.0 μm are distributed on the upper substrate 63b at the ratio of about 100 to about 200 beads/mm². The upper and lower substrates 63a and 63b are, then, bonded together, and the sealing resin is set at a temperature of 150° C. After that, a liquid crystal is vacuum-injected through an injection port. As the liquid crystal, a mixture of a nematic liquid crystal of fluorine ester system having an optical anisotropy AnLC of 0.08 and a chiral liquid crystal is employed. The mixture of liquid crystals is formulated to achieve a chiral pitch of 80 μm. After injection of the liquid crystal, the injection port is sealed by a ultraviolet-setting resin, and the resin is then set by a ultraviolet ray. In such manner, the liquid crystal cell 6 is prepared.

On the substrate 63a of liquid crystal cell 6 formed in such manner, the optical compensation layer 62 is applied to provide a normally white appearance. The optical compensation layer 62 has two polycarbonate films. Above the optical compensation layer 62, the optical member 61 having a retardation axis when it is viewed from the front side is provided. For such optical member 61, a polycarbonate film is employed.

Further, the polarizing film 60 is provided on the optical compensation layer 62. As the polarizing film 60, a neutral gray polarizing film (SQ-1852AP prepared by Sumitomo Chemical Co., Ltd.) is employed after it is subjected to antiglare (AG) treatment and antireflection (AR) treatment. In this step, such arrangement is made that an absorption axis of the polarizing film 60 is positioned at an angle of 90° in relation to the retardation axis of optical member 61. Then, a silver diffuse reflecting plate is provided as the diffuse reflecting plate 69 outside the lower substrate 63b.

Thus, by using transparent substrates as the upper and lower substrates 63a and 63b, employing the transparent electrode 68 in place of the metallic reflecting electrode used in Embodiments 1 to 3, and providing the diffuse reflecting plate 69 in a surface of the liquid crystal cell 6, a reflection type liquid crystal display device having a viewing angle characteristic that is changed in a natural manner was obtained. In the embodiment, although slight dimness and blurring of an image due to an effect of parallax was detected, the blurring was within an acceptable range.

Front-side properties of the reflection type liquid crystal display device were measured. As a result, a reflectivity converted to a Y-value of white was at 17.9%, and a contrast at 14.5, thus a light utilization factor was sufficient.

A reflection type liquid crystal display device was produced by removing the color filter layer 64 from the reflection type liquid crystal display device according to the embodiment. In regard to front-side properties of the reflection type liquid crystal display device., a reflectivity converted to a Y-value of white was at 33.7% and a contrast was at 14.1. Thus, in the reflection type liquid crystal display device without the color filter for black and white display, because the reflectivity of white display was particularly high, the reflection type liquid crystal display provided a bright image.

Further, a display device was produced in such constitution that the diffuse reflecting plate 69 was not completely bonded to the lower substrate 63b by using an adhesive, when the former is placed under the latter, so that an air layer is provided between the diffuse reflecting plate 69 and lower substrate 63b. In such constitution, it was confirmed that a diffusing effect is enhanced by a difference between the refractive index (about 1.6) of resin and that (1.0) of air, and a liquid crystal display device having more natural viewing angle characteristic was accordingly obtained.

Although silver is employed for the diffuse reflecting plate 69 in the embodiment, aluminum may be also used for the diffuse reflecting plate 69, and it was confirmed that a superior effect similar to that described above was obtained in such constitution as well.

In above description, although the absorption axis of polarizing film 60 is positioned only at an angle of 90° in relation to the retardation axis of optical member 61, the angle is preferably within a range of about 88° to about 92° or about −2° to about +2°, and a superior effect similar to that described is also obtained in such case.Further, although a polymer film of polycarbonate is employed as the optical member 61 in above constitution, such material as polyallylate and polysulfone may be also employed as the optical member 61, and an effect similar to that above can be obtained. However, materials of the optical member 61 is not limited thereto, and other materials having a retardation value that meets the conditions may be used.

Exemplary Embodiment 5

Figure 7:
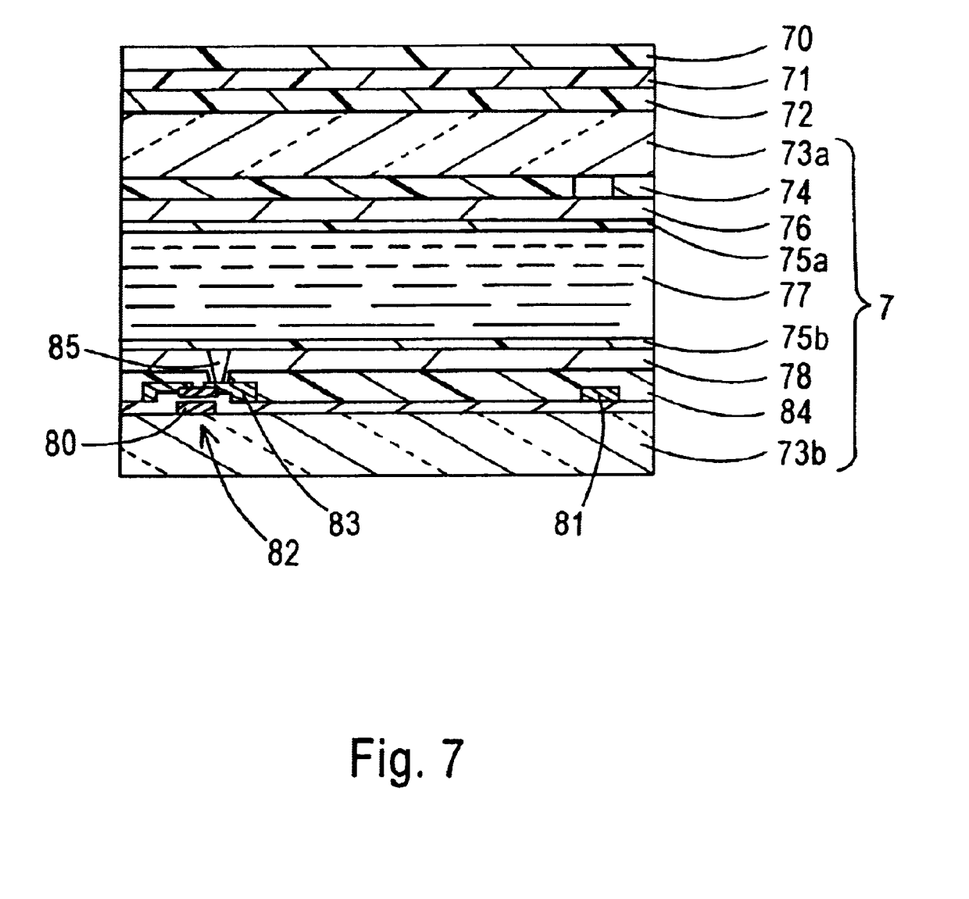
FIG. 7 is a schematic sectional view of a reflection liquid crystal display device according to Embodiment 5 of the invention.

FIG. 7 is a schematic sectional view of a reflection type liquid crystal display device according to Embodiment 5of the invention. In the reflection type liquid crystal display device of FIG. 7, an optical compensation layer 72, an optical member 71 and a polarizing film 70 are laminated in a surface of a liquid crystal cell 7 in that order. The optical member 71 has a retardation axis when it is viewed from the front side, that is, in the normal direction.

The liquid crystal cell 7 comprises an upper substrate 73a and a lower substrate 73b. The upper substrate 73a is provided with a color filter layer 74, a transparent electrode 76 and an alignment layer 75a. The lower substrate 73b is provided with a metallic reflecting electrode 78 and an alignment layer 75b. A liquid crystal layer 77 is provided by sealing a liquid crystal between the upper and lower alignment layers 75a and 75b. Out of the upper and lower substrates 73a and 73b, at least the substrate 73a is transparent.

The reflection type liquid crystal display device according to the embodiment further comprises a non-linear switching device, and is actively driven. The metallic reflecting electrode 78 is electrically in communication with a thin film transistor (TFT) device 82 below a flattening film 84 through a contact hole 85. The thin film transistor device 82 functions as the non-linear switching device. The thin film transistor device 82 has a gate electrode 80, a source line 81 and a drain electrode 83.

Now, a production process of the reflection type liquid crystal display device is described.

For the upper and lower substrates 73a and 73b, noalkali glass substrates (for example, 1737 prepared by Corning) are employed. First, the color filter layer 74 with red, green and blue stripes provided in alignment with each other by using dyes of pigment dispersion type is formed on the upper substrate 73a by photolithography. Above the color filter layer 74, the transparent electrode 76 as a pixel electrode is formed by using indium-tin oxide (ITO).

Further, the gate electrode 80 comprising aluminum and tantalum, the source electrode 81 comprising titanium and aluminum and the drain electrode 83 are provided on the lower substrate 73b in a matrix arrangement by a known method. In such manner, the TFT device 82 comprising. amorphous silicon is formed in every intersection between the gate electrode 80 and source electrode 81.

A photosensitive acrylic resin of positive type (for example, FVR prepared by Fuji Pharmaceutical Co., Ltd.) is applied to an entire surface of the lower substrate 73b in which the TFT device 82 is provided, and the flattening film 84 is thereby formed. Then, it is exposed to a ultraviolet ray by using a predetermined photomask to form the contact hole 85 on the drain electrode 83, and the surface of flattening film 84 is given an uneven shape.

Above the flattening film 84, a titanium layer is formed by deposition to a thickness of 300 nm, and an aluminum layer to 200 nm in thickness is formed by deposition on the titanium layer. In such manner, the metallic reflecting electrode 78 of diffuse (scattering) reflection type having a mean inclination angle of 3° to 12° in the surface is provided.

Next, a y-butyrolactone solution containing 5wt. % of polyimide is applied by printing onto the transparent electrode 76 and metallic reflecting electrode 78, and set at a temperature of 250° C. After that, an alignment process is conducted by rotational rubbing method using a rayon cloth. In such manner, the upper alignment layer 75a and lower alignment layer 75b having a twist angle of 63° are formed. The twist angle is not limited to above angle, and is preferably within a range of about 40° to about 90°.

Then, a thermosetting sealing resin (for example, Stract Bond prepared by Mitsui Toatsu Chemicals, Inc.) containing 1.0 wt. % of glass fibers is applied by printing to a peripheral part of the surface of upper substrate 73a. The glass fiber has a diameter of 4.0 $\mu$m. Resin beads having a diameter of 3.0 $\mu$m are distributed on the lower substrate 73b at the ratio of about 100 to about 200 beads/mm$^2$. The upper and lower substrates 73a and 73b are bonded together, and the sealing resin is set at a temperature of 150° C. After that, a liquid crystal is vacuum-injected through an injection port. As the liquid crystal, a mixture of a nematic liquid crystal of fluorine ester system having an optical anisotropy $\Delta n_{LC}$ of 0.08 and a chiral liquid crystal is employed. The mixture of liquid crystals is formulated to achieve a chiral pitch of 80 $\mu$m. After injection of the liquid crystal, the injection port is sealed by a ultraviolet-setting resin, and the resin is then set by a ultraviolet ray.

In order to provide a normally white appearance, the optical compensation layer 72 is applied onto the upper substrate 73a. The optical compensation layer 72 comprises two polycarbonate films. Above the optical compensation layer 72, a polycarbonate film is adhered as the optical member 71 having a retardation axis when it is viewed from the front side.

Further, the polarizing film 70 is adhered onto the optical member 71. As the polarizing film 70, a neutral gray polarizing film (SQ-1852AP prepared by Sumitomo Chemical Co., Ltd.) is employed after it is subjected to antiglare (AG) treatment and antireflection (AR) treatment. In this step, such arrangement is made that an absorption axis of the polarizing film 70 is positioned at an angle of 90°. in relation to the retardation axis of polycarbonate of the optical member 71.

As a result of above process, a reflection type liquid crystal display device according to the embodiment is completed.

Optical properties of the reflection type liquid crystal display device correspond to those of Embodiment 1 that is modified for active driving, and full-color display of 64 gradations can be obtained according to the embodiment. Since the metallic reflecting electrode 78 of diffuse (scattering) type is provided on the flattening film 84, the aperture ratio reaches 97%. In regard to front-side properties of the display device, a reflectivity converted to a Y-value of white was at 19.2%, and a contrast at 15.9, thus a sufficient light utilization factor was achieved.

In above description, although the absorption axis of polarizing film 70 is positioned only at an angle of 90° in relation to the retardation axis of optical member 71, the angle is preferably within a range of about 88° to about 92° or about −2° to about +2°, and a superior effect similar to that described above can be obtained in such constitution.

Also, although a high polymer film of polycarbonate is employed as the optical member 71 in the embodiment, such material as polyallylate and polysulfone may be alternatively employed to provide a similar effect. Materials of the optical member 71 are not limited thereto, and other materials providing a retardation value that meets the conditions may be also employed.

In all embodiments described, a reflection type liquid crystal device of active drive type can be obtained by further providing such non-linear device as TFT in one of the substrates. As the non-linear device, such device as two-terminal device (MIM or thin film diode, etc.) and polysilicon TFT may be also employed alternatively to the amorphous silicon TFT, and an effect similar to that described can be obtained also in such constitution.

As described above, according to the invention, a reflection type liquid crystal display device providing a wide viewing angle, and capable of assuring a light utilization factor at or above a certain value so that bright display is provided even when conditions of an external light are varied.

What is claimed is:

1. A reflection type liquid crystal display device comprising:

a liquid crystal cell having an upper substrate, a lower substrate and a liquid crystal layer provided between the upper and lower substrate;

a polarizing film provided in a side of the upper substrate in the liquid crystal cell;

light reflecting means provided in a side of the lower substrate in the liquid crystal cell; and an optical member provided between the polarizing film and the liquid crystal cell, the optical member having a retardation axis when it is viewed in a normal direction, wherein an angle between an absorption axis of the polarizing film and the retardation axis of the optical member is within the range of about 88° to about 92°, wherein the optical member is of a hybrid tilt type, the optical member having a refractive index "nx" in the direction of "x", a refractive index "ny" in the direction of "y", and a refractive index "nz" in the direction of "z", the direction of "y" falling within a surface of the optical member.

2. A reflection type liquid crystal display device of claim 1, wherein a retardation value in relation to the normal direction of the optical member is within a range of about 50 nm to about 500 nm.

3. A reflection type liquid crystal display device of claim 1, wherein a retardation value in relation to the normal direction of the optical member is within a range of about 200 nm to about 400 nm.

4. A reflection type liquid crystal display device of claim 1, wherein the optical member is a polymer film.

5. A liquid crystal display device of claim 1, wherein the optical member comprises at least a polymer film selected from the group consisting of polycarbonate, polyallylate and polysulfone.

6. A reflection type liquid crystal display device of claim 1, wherein the optical member has a refractive index of hybrid tilt type that is continuously changed from one to the other side thereof.

7. The reflection type liquid crystal display device of claim 1, wherein the voptical member has at least one relation of "nx>ny=nz" and "nx=ny>nz", "nx" at a state that the optical member is viewed in the direction of "y", has a tilt angle within a range of about 0° to about 10° in a side of the optical member, a tilt angle within a range of about 60° to about 90° in the other side of the optical member, and a tilt angle which continuously changes between said one to the other side.

8. A reflection type liquid crystal display device of claim 7, wherein the optical member comprises a first substrate subjected to a homeotropic alignment layer treatment, a second substrate subjected to a homogeneous alignment layer treatment and a nematic liquid crystal provided between the first and second substrates.

9. A reflection type liquid crystal display device of claim 1,
wherein the optical member is of a hybrid tilt type,
the optical member has a refractive index "$n_x$" in the direction of "x", a refractive index "$n_y$" in the direction of "y" and a refractive index "$n_z$" in the direction of "z",
the direction of "y" falls within a surface of the optical member,
a relation of "$n_x \approx n_y > n_z$" is met, and "$n_z$" when the optical member is viewed in the direction of "y" has
a tilt angle within a range of about 0° to about 10° in a side of the optical member, a tilt angle within a range of about 60° to about 90° in the other side of the optical member, and a tilt angle continuously changed between said one to the other side.

10. A reflection type liquid crystal display device of claim 9, wherein the optical member comprises a first substrate subjected to a homeotropic alignment layer treatment, a second substrate subjected to a homogeneous alignment layer treatment and a discotic liquid crystal provided between the first and second substrates.

11. A reflection type liquid crystal display device of claim 1, wherein the liquid crystal layer contains a nematic liquid crystal.

12. A reflection type liquid crystal display device of claim 1,
wherein the liquid crystal layer contains a nematic liquid crystal, and
the liquid crystal cell has a twisted nematic liquid crystal cell having a twist angle within a range of about 40° to about 90°.

13. A reflection type liquid crystal display device of claim 1,
wherein the liquid crystal layer contains a nematic liquid crystal, and
the liquid crystal cell has a super-twisted nematic liquid crystal cell having a twist angle within a range of about 220° to about 260°.

14. A reflection type liquid crystal display device of claim 1 further comprising an optical retardation film between the optical member and the liquid crystal cell.

15. A reflection type liquid crystal display device of claim 14, wherein the optical retardation film has at least a polymer film.

16. A reflection type liquid crystal display device of claim 1, wherein the light reflecting means is a metallic reflecting electrode.

17. A reflection type liquid crystal display device of claim 16, wherein the metallic reflecting electrode contains at least a metal selected from aluminum and silver.

18. A reflection type liquid crystal display device of claim 16, wherein the metallic reflecting electrode has a mirror surface.

19. A reflection type liquid crystal display device of claim 16, wherein the metallic reflecting electrode has a diffuse reflecting surface for diffuse reflection of an incident light.

20. A reflection type liquid crystal display device of claim 16,
wherein the metallic reflecting electrode has a diffuse reflecting surface for diffuse reflection of an incident light, and
the diffuse reflecting surface is provided with unevenness within a range of about 3° to about 12° in mean inclination angle.

21. A reflection type liquid crystal display device of claim 1,
wherein the light reflecting means is a metallic reflecting electrode, and
the metallic reflecting electrode has a scattering film provided in a surface thereof.

22. A reflection type liquid crystal display device of claim 1,
wherein the lower substrate is a transparent substrate, and
the light reflecting means is a light reflecting plate provided outside the lower substrate.

23. A reflection type liquid crystal display device of claim 22, wherein the light reflecting plate is a diffuse reflecting plate.

24. A reflection type liquid crystal display device of claim 1,
wherein the lower substrate is a transparent substrate,
the light reflecting means is a light reflecting plate provided outside the lower substrate, and
an air layer is provided between the transparent substrate and the light reflecting plate.

25. A reflection type liquid crystal display device of claim 1 further comprising a color filter provided in a side of the upper substrate.

26. A reflection type liquid crystal display device of claim 1 further comprising a non-linear element provided in a side of the lower substrate.

27. A reflection type liquid crystal display device of claim 1 further comprising:
a non-linear element provided in a side of the lower substrate; and
an insulating flattening film provided on the nonlinear element,
wherein the light reflecting means has a metallic reflecting electrode, and
the flattening film has a contact hole in electrical communication with the non-linear element and the metallic reflecting electrode.

28. A reflection type liquid crystal display device comprising:
- a liquid crystal cell having an upper substrate, a lower substrate and a liquid crystal layer provided between the upper and lower substrate;
- a polarizing film provided in a side of the upper substrate in the liquid crystal cell;
- light reflecting means provided in a side of the lower substrate in the liquid crystal cell; and
- an optical member provided between the polarizing film and the liquid crystal cell, the an optical member having a retardation axis when it is viewed in a normal direction, and
- a scattering film provided in a side of the upper substrate,
- wherein an angle between an absorption axis of the polarizing film and the retardation axis of the optical member is within at least one of ranges of:
  - (i) about 88° to about 92° and (ii) about −2° to about +2°, and
    - wherein the optical member is of a hybrid tilt type, the optical member having a refractive index "nx" in the direction of "x", a refractive index "ny" in the direction of "y", and a refractive index "nz" in the direction of "z",
    - the direction of "y" falling within a surface of the optical member.

29. A reflection type liquid crystal display device of claim 28, wherein the scattering film is a forward scattering film.

30. The reflection type liquid crystal display device of claim 16, wherein a retardation value in relation to the normal direction of the optical member is within a range of about 50 mn to about 500 mn.

31. The reflection type liquid crystal display device of claim 16, wherein the optical member is of a hybrid tilt type, the optical member having a refractive index "nx" in the direction of "x", a refractive index "ny" in the direction of "y" and a refractive index "nz" in the direction of "z", the direction of "y" falling within a surface of the optical member.

32. The reflection type liquid crystal display device of claim 16, wherein the optical member has a relation of "nx>ny=nz" or "nx=ny>nz", "$n_x$" at a state that the optical member is viewed in the direction of "y", has a tilt angle within a range of about 0° to about 10° in a side of the optical member, a tilt angle within a range of about 60° to about 90° in the other side of the optical member, the tilt angle continuously changing between said one to the other side.

33. The reflection type liquid crystal display device of claim 32, wherein the optical member comprises a first substrate subjected to a homeotropic alignment layer treatment, a second substrate subjected to a homogeneous alignment layer treatment and a nematic liquid crystal provided between the first substrate and the second substrate.

34. The reflection type liquid crystal display device of claim 16, wherein the liquid crystal layer contains a nematic liquid crystal.

35. The reflection type liquid crystal display device of claim 16, further comprising an optical retardation film between the optical member and the liquid crystal cell.

36. The reflection type liquid crystal display device of claim 16, further comprising a non-linear element provided in a side of the lower substrate.

37. A reflection type liquid crystal display device comprising:
- a liquid crystal cell having an upper substrate, a lower substrate and a liquid crystal layer provided between the upper and lower substrate;
- a polarizing film provided in a side of the upper substrate in the liquid crystal cell;
- light reflecting means provided in a side of the lower substrate in the liquid crystal cell; and
- an optical member provided between the polarizing film and the liquid crystal cell, the optical member having a retardation axis when it is viewed in a normal direction,
- wherein an angle between an absorption axis of the polarizing film and the retardation axis of the optical member is within the range of about 88° to about 92°,
- said liquid crystal layer containing a nematic liquid crystal,
- said liquid crystal layer having a twisted nematic liquid crystal cell having a twisted angle within a range of (i) about 40° to about 60° or (ii) about 71° to about 89°.

38. The reflection type liquid crystal display device of claim 37, wherein a retardation value in relation to the normal direction of the optical member is within a range of about 50 mm to about 500 mm.

39. The reflection type liquid crystal display device of claim 37, further comprising a scattering film provided in a side of the upper substrate.

40. The reflection type liquid crystal display device of claim 37, wherein the optical member is of a hybrid tilt type, the optical member having a refractive index "nx" in the direction of "x", a refractive index "ny" in the direction of "y" and a refractive index "nz" the direction of "z", the direction of "y" falling within a surface of the optical member.

41. The reflection type liquid crystal display device of claim 40, wherein the optical member has a relation of "nx>ny=nz" or "nx=ny>nz", "nx" at a state that the optical member is viewed in the direction of "y", has a tilt angle within a range of about 0° to about 10° in a side of the optical member, a tilt angle within a range of about 60° to about 90° in the other side of the optical member, and a tilt angle which continuously changes between said one to the other side.

* * * * *